Nov. 1, 1932.     W. H. KLEINSTEIBER     1,886,195

PARALLEL GROOVE CLAMP

Filed Sept. 17, 1930

Inventor:
William H. Kleinsteiber

Patented Nov. 1, 1932

1,886,195

UNITED STATES PATENT OFFICE

WILLIAM H. KLEINSTEIBER, OF TORONTO, ONTARIO, CANADA, ASSIGNOR TO CANADIAN LINE MATERIALS LIMITED, OF SCARBORO JUNCTION, ONTARIO, CANADA

PARALLEL GROOVE CLAMP

Application filed September 17, 1930. Serial No. 482,500.

The principal objects of the invention are, to provide a simple form of clamp, particularly adapted for securing the ends of electric conductor cables which will be very easily applied and will securely hold the cable ends, providing the maximum of conductivity.

The principal features of the invention consist in the novel construction of a pair of longitudinally grooved members adapted to embrace the cables to be secured, said members being drawn into clamping position by bolts arranged on either side.

In the drawing, Figure 1 is side elevational view of my improved clamp shown attaching the cable ends.

Figure 1:
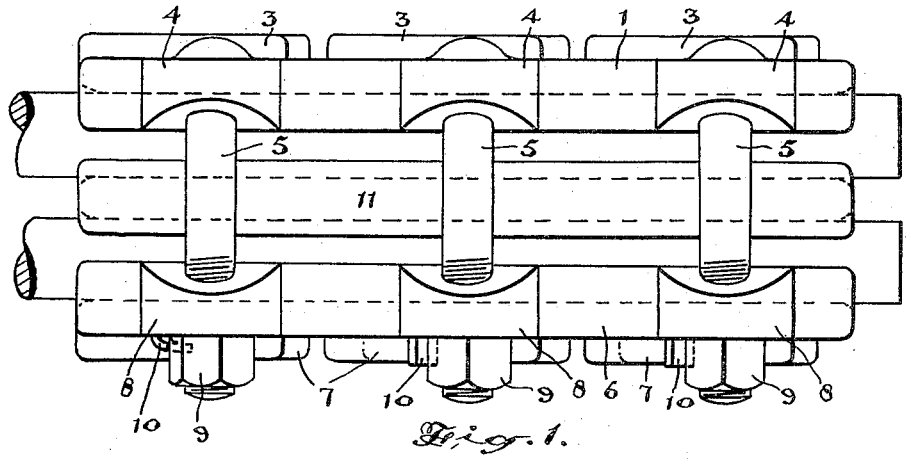
Figure 2:
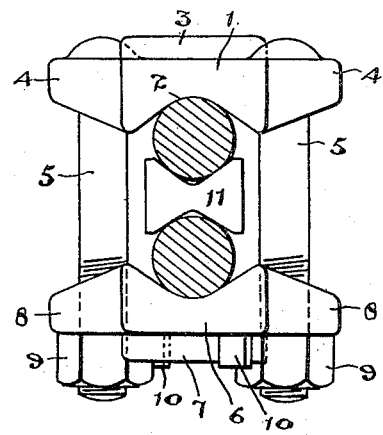
Figure 2 is an end elevational view.
Figure 3:
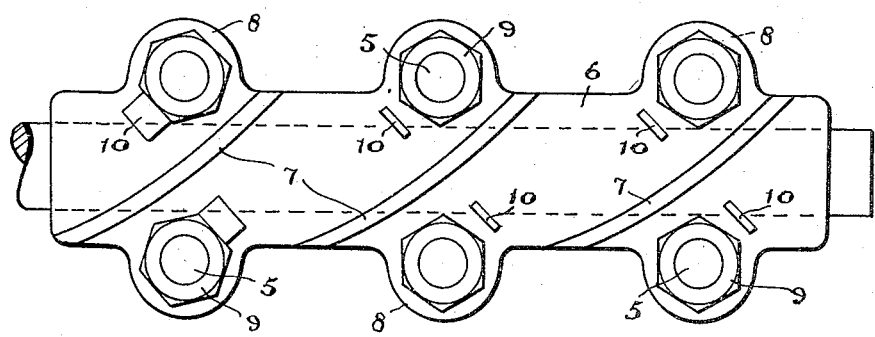
Figure 3 is an underside plan view.

In the stringing of transmission lines, the length of the cable is of course limited and it is necessary to secure the meeting ends of the cable length in very secure and positively contacting joints, so that there will be the maximum of strength at the joint, without the liability of the cables parting and a union which will offer no material resistance to the flow of the current from one length of cable to the other.

The device as herein shown consists of an upper clamp block 1 which is formed with a groove 2 extending longitudinally of one side thereof with convergingly bevelled sides and a central contour to preferably conform to the cross sectional circumference of the cable.

The upper side of the clamp bar 1 is preferably reinforced by diagonally arranged ribs 3 and lugs 4 preferably tapering outwardly extend from the side walls of the member 1 at spaced intervals and in these lugs are mounted the bolt connectors 5.

The bolts 5 are preferably cast into the metal of the lugs 4 of the bar 1 which is preferably formed of bronze and said bolts extend in parallel arrangement.

The lower clamp member 6 is formed with a longitudinally grooved central member reinforced on the back by the diagonally arranged strips 7 and having the laterally extending lugs 8 corresponding with the lugs 4 on the member 1.

The latter lugs are bored to receive the threaded ends of the bolts 5 which pass therethrough and said bolts are surmounted by nuts 9.

It will be noted that a small lug or tongue of metal 10 extends from the underside of the clamp 6 at the base of each of the lugs 8. These metal tongues may be cast integral with the clamp member forming a part of the clamp, or they may be composed of strips of metal of a more pliable nature than the metal of the clamp and embedded therein in the casting operation. The function of these lugs or tongues is to be bent over to engage and lock with the side faces of the nuts 9 to secure them from turning after the clamp has been drawn taut.

It has been stated that it is preferred to cast the bolts 5 integral with the upper clamp member, but the bolt may be of the ordinary headed variety inserted through holes in the lugs, in which case the upper clamp member is provided with fastening tongues similar to those shown on the lower clamp member to engage the heads of the bolts to keep the bolts from turning.

A liner strip 11 which is formed of a material corresponding to the material of the cables, is shaped with longitudinal grooves, the sides of which converge transversely in a broad V-shape, and this liner is inserted between the two cable ends so that when the clamp members are drawn taut by the bolts 5 a uniform contact is established between the two cables and the material being of the same quality as that of the wire will conduct the electric current flowing with substantially no resistance.

The broad V-shaped grooved surface of the clamp members co-operating with the liner grips the cables securely throughout their entire length and longitudinal springing of the clamp is avoided between the bolts 5 by the use of the diagonal reinforcing ribs on the back.

What I claim as my invention is:—

1. A cable clamp comprising, the combination with the cables to be secured, of a pair of longitudinally grooved members each having a plurality of spaced reinforcing ribs on the outer side and having a pair of laterally extending lugs associated with each of said ribs, the lugs of each pair being disposed on opposite sides of the adjacent rib, bolts extending through said lugs, and a grooved liner arranged between the cables.

2. A cable clamp, comprising a pair of longitudinally grooved members having a plurality of transversely aligned pairs of lugs projecting laterally therefrom, bolts non-rotatably secured in the lugs of one of said grooved members and extending through the respective lugs of the other of said grooved members, clamping nuts threaded on said bolts, one of said grooved members having locking lugs extending therefrom which are of a more pliable nature than the body metal thereof adapted to be displaced to lock the clamping nuts from rotation.

3. A cable clamp, comprising a pair of longitudinally grooved members having a plurality of transversely aligned pairs of lugs projecting laterally therefrom, threaded clamping members engaging said lugs, certain of said threaded members presenting locking faces, and locking members rigidly secured in one of said members and being of a more pliable nature than the body material of said grooved members and adapted to be bent laterally into locking contact with the locking faces of said certain threaded members.

4. A cable clamp, comprising the combination with the cables to be secured, of a pair of clamping members each having a plurality of laterally extending lugs arranged in pairs, each pair disposed on a line extending in substantially right angular transverse relation to the clamping members, reinforcing ribs on the outward faces of said members extending diagonally across a line connecting the respective lugs of each pair, longitudinal grooves on the inner faces between said lugs, a grooved liner to be inserted between the cables, and clamping bolts extending through the lugs of the respective clamping members.

5. In a cable clamp, the combination with a pair of longitudinally grooved members having lugs, bolts non-rotatable in the lugs of one of said members and extending through the corresponding lugs of the other member, and nuts threaded on the bolts and engaging the latter lugs, said latter clamping member being formed of cast metal and having a plurality of locking members formed separate from the cast member of a softer material than that of the said cast member embedded therein in the casting operation in proximity to the lugs of said member, said locking members being adapted to be displaced into locking engagement with said nuts to hold same from rotation.

WILLIAM H. KLEINSTEIBER.